United States Patent [19]

Wydeven

[11] 4,410,427
[45] Oct. 18, 1983

[54] FLUID FILTERING DEVICE

[75] Inventor: Robert M. Wydeven, Egan, Minn.

[73] Assignee: Donaldson Company, Inc., Minneapolis, Minn.

[21] Appl. No.: 317,275

[22] Filed: Nov. 2, 1981

[51] Int. Cl.³ .......................................... B01D 27/06
[52] U.S. Cl. .................................. 210/317; 210/487; 210/492; 210/493.3
[58] Field of Search ............... 210/314, 315, 317, 446, 210/450, 451, 484, 486, 487, 488, 492, 493.1, 493.3, 493.4, 493.5, 494.1, 497.01

[56] References Cited

U.S. PATENT DOCUMENTS

| | | | |
|---|---|---|---|
| 1,729,135 | 9/1929 | Slauson | 55/159 X |
| 2,190,886 | 2/1940 | Schaaf et al. | 55/498 X |
| 2,210,397 | 8/1940 | Dreiss | 210/487 X |
| 2,322,548 | 6/1943 | Sigmund | 210/487 X |
| 2,397,759 | 4/1946 | Sigmund | 55/498 X |
| 2,599,604 | 6/1952 | Bauer et al. | 210/487 X |
| 3,020,977 | 2/1962 | Huppke et al. | 210/494.1 X |
| 3,025,963 | 3/1962 | Bauer | 210/493.4 |
| 3,037,637 | 6/1962 | Bub | 210/487 |
| 3,070,937 | 1/1963 | Bub | 55/387 |
| 3,112,262 | 11/1963 | Parkinson | 210/494.1 X |
| 3,346,121 | 10/1967 | Bally | 210/493.3 |
| 3,372,533 | 3/1968 | Rummel | 210/493.1 X |
| 3,401,803 | 9/1968 | Bub | 210/488 |
| 3,759,391 | 9/1973 | Dreher | 210/494.1 |
| 3,807,150 | 4/1974 | Maracle | 55/498 |
| 3,858,793 | 1/1975 | Dudrey | 233/2 |
| 3,962,097 | 6/1976 | Reiman et al. | 210/487 X |
| 4,039,457 | 8/1977 | Schacht et al. | 210/493.4 |
| 4,065,341 | 12/1977 | Cub | 210/487 X |
| 4,310,419 | 1/1982 | Nara et al. | 210/493.4 |

FOREIGN PATENT DOCUMENTS

| | | | |
|---|---|---|---|
| 671096 | 2/1939 | Fed. Rep. of Germany | 210/492 |
| 2951216 | 7/1981 | Fed. Rep. of Germany | |
| 1106115 | 12/1955 | France | 210/487 |
| 717304 | 10/1954 | United Kingdom | 210/492 |
| 764846 | 1/1957 | United Kingdom | 210/487 |
| 884027 | 10/1961 | United Kingdom | |

OTHER PUBLICATIONS

Crossflow Catalytic Afterburner drawing.

Primary Examiner—Robert H. Spitzer
Attorney, Agent, or Firm—Merchant, Gould, Smith, Edell, Welter & Schmidt

[57] ABSTRACT

A fluid filtering device in various embodiments is disclosed. The filter includes, in one embodiment, alternating layers (34, 36) of flat and corrugated filter media which are rolled together and sealed at alternate ends by sealant (38, 42). Further embodiments disclose filter packs (112, 212, 312) of alternating layers of flat and corrugated filter media. In one embodiment, corrugations of successive layers are aligned in parallel. In an alternate embodiment corrugations are aligned orthogonally. Unfiltered fluids enter tubular passages (44) for example, and must exit by adjacent passages either above, below or beside the flute of entry to exit the filter. Filtering occurs when the fluid crosses a sidewall of filter media.

7 Claims, 12 Drawing Figures

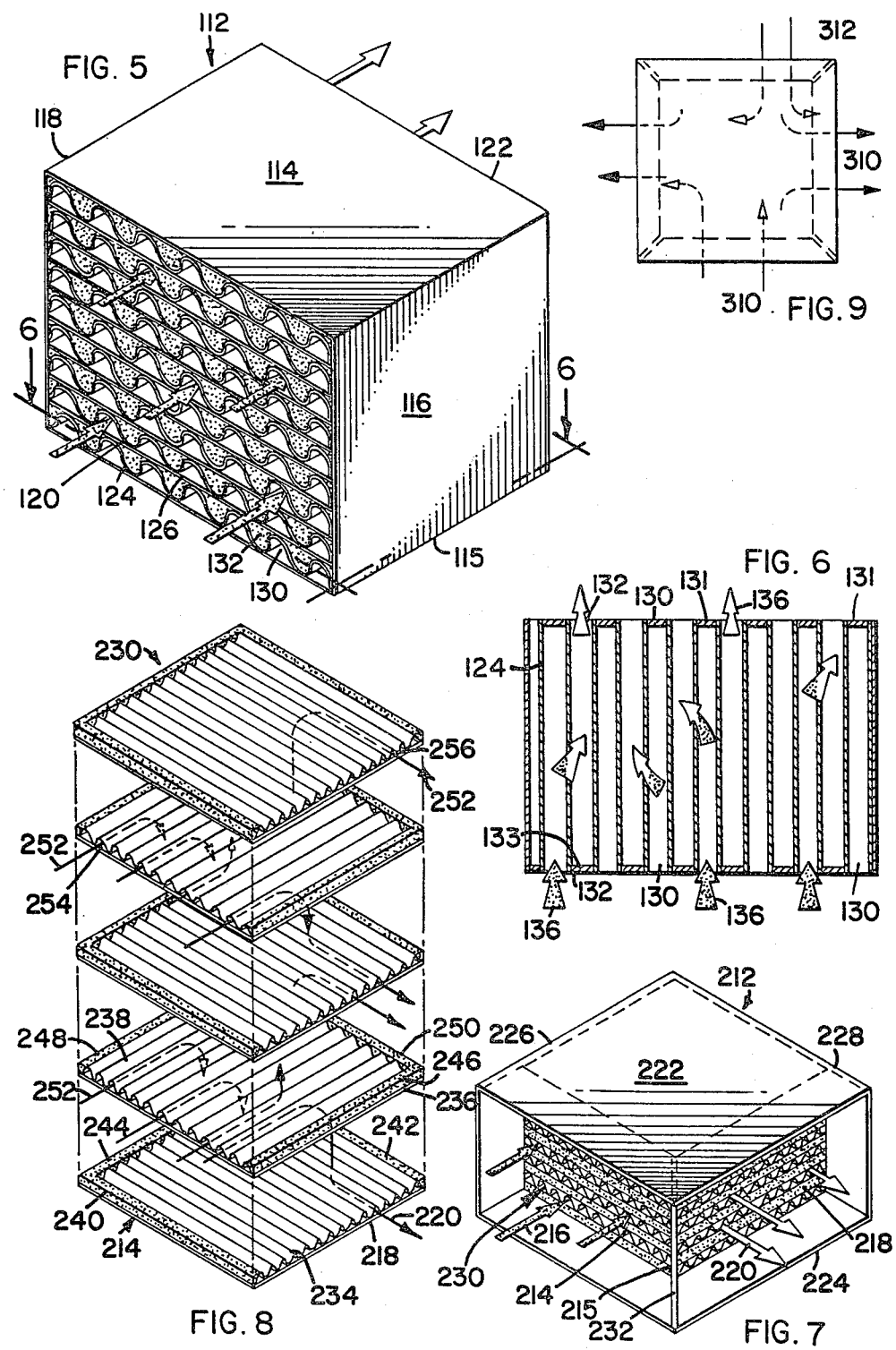

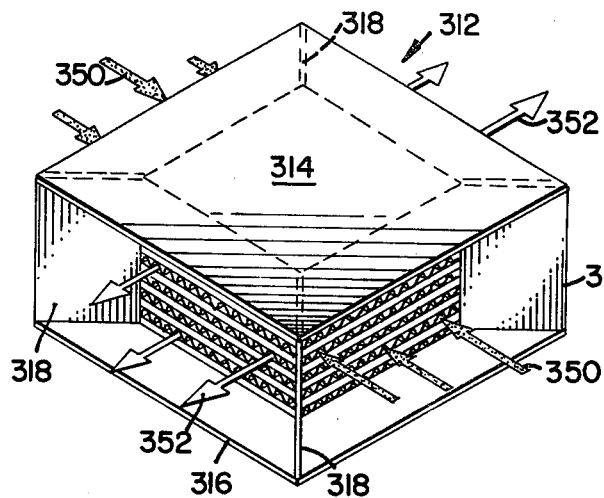
FIG. 10
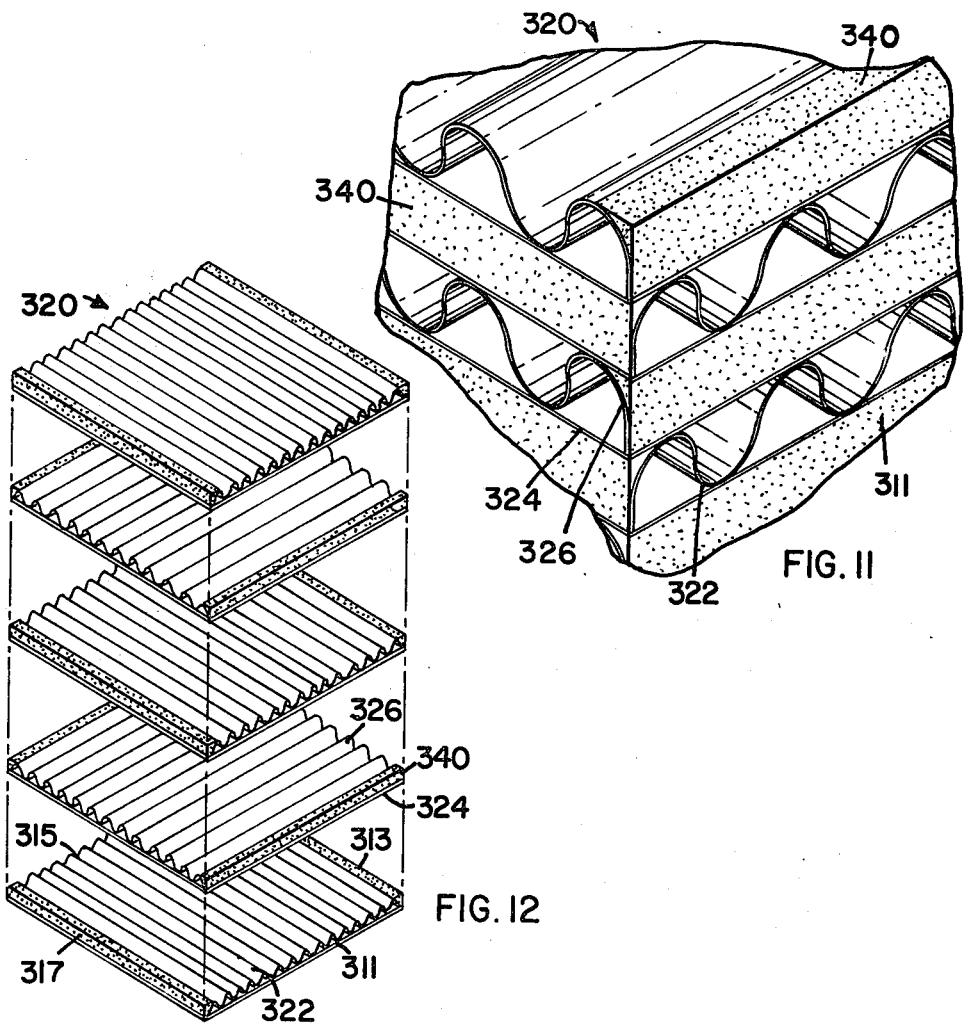
FIG. 11
FIG. 12

FLUID FILTERING DEVICE

TECHNICAL FIELD

The present invention relates to fluid filtering devices, more particularly devices using generally corrugated filter media in combination with flat media.

BACKGROUND OF THE INVENTION

In creating a fluid filter, an attempt is made to maximize the loading capacity while simultaneously minimizing the volume of the filter itself and its face velocity. Simultaneously, it is desirable to simplify or eliminate the housing structure necessary to support the filter. All of these factors must be considered with an eye to keeping the overall cost to a minimum.

Pleated paper filters with rigid housings have long been the industry standard for most filtering application. These filters, however, require relatively expensive housing structures and have relatively low filter densities and loading capacities.

Attempts have been made to increase the filter density and loading capacity of filter elements. One such filter is described in U.S. Pat. No. 2,322,548 issued to Sigmund wherein an impervious board matrix separates a flat filtering sheet which is rolled into a cylindrical shape. Filtering occurs when the fluid entering the intake side must cross through the inner walls at a right angle to exit by the outlet side. U.S. Pat. No. 2,210,397 issued to Dreiss uses a similar to orthogonal flow filtering scheme by carefully aligning two sheets of substantially flat filter paper with a specially designed top and bottom plates to direct airflow. U.S. Pat. No. 3,020,977 issued to Huppke et al. introduces the additional feature of corrugated material between flat sheets, although the corrugated material performs no filtering function, merely acts as a spacer. Likewise, U.S. Pat. No. 2,397,759 issued to Sigmund employs a corrugated member as a spacer. None of these devices is able to achieve the high filtering density desired because of the use of materials which are merely structure rather than both structural and performing a filtering function.

The present invention recognizes the value of orthogonal filtering flow while insuring that every element of the filter performs both a structural and a filtering function, rather than merely one or the other. Thus, the desired result of maximizing strength and filter density while reducing face velocity and cost are achieved by the present invention.

BRIEF SUMMARY OF THE INVENTION

The present invention is, in one embodiment, directed to a fluid filter for removing particulate matter including a roll of substantially flat filter media, a role of corrugated filter media, the nesting of said rolls together to form a composite roll so that alternate corrugated and flat media layers are in contact, thereby forming a plurality of longitudinal flutes extending through the roll from one end to the other, the flutes being formed in two spiral series one on either side of the corrugated media, sealant means allowed to one of the spiral series of flutes at one end of the composite roll and applied to the other series of flutes at the other end of composite roll so that fluid entering the remaining open flutes on one end of the roll must exit via the other series of open flutes on the other end and thereby being filtered.

According to a further aspect of the invention, a fluid filter is disclosed including a top, bottom, two sides and a front and back, said top, bottom and two sides being fluid impervious, a fluid filter disposed within said sides, the element including a first corrugated layer of filter media having one surface in contact with the top corrugations being orthogonal to the two sides of the filter, a second corrugated layer of filter media with one surface in contact with the bottom, the corrugations of the second layer being aligned in parallel with the corrugations of the first layer and intermediate element of filter media disposed between and in contact with the remaining sides of the first and second layers, the first, second and intermediate layers forming together a plurality of tubular passages having ends opened at the front and back, sealant means for preventing the entry and exit of fluids therethrough applied to every other of the openings of said first and second layers on the front side and applied to the openings on the back side on the remaining openings which are opened to the front side, so that the fluids entering the unsealed openings in one side of the filter must exit the filter on the other side of a different passage.

According to a further aspect of the invention, there is disclosed a fluid filter having four sides, and top and bottom comprising a pair of fluid impervious planar members in a spaced relationship, a filter element bounded on its upper and lower sides by the planar members, the element including a filter pack having a first corrugated filter media having longitudinal peaks and valleys thereacross, a second layer atop the first layer, the second layer being of substantially flat filter media, a third layer atop the second layer, the third layer being of corrugated media having longitudinal peaks and valleys which are oriented orthogonal to the corrugations of the first layer, sealant means applied to the first and second layers on peripheral edges thereof which are parallel to the axis defined by the longitudinal corrugations of the third layer for preventing entry and exit of fluid therethrough, said sealant means also being applied to the second and third layers on the peripheral edges which are parallel to the axis defined by the longitudinal corrugations of the first layer.

According to another aspect of the invention, the filter in the above paragraph may include additional sealant means for blocking passage of fluids therethrough applied to the two adjacent sides of the filter so that only the two remaining unsealed sides will allow passage of fluids into and out of the filter.

BRIEF DESCRIPTION OF THE DRAWINGS

The specific embodiments of the invention have been chosen for the purpose of illustration and description and are shown in the accompanying drawings which form a part of the specification wherein:

FIG. 5 is a perspective view of a second embodiment of the invention;

FIG. 6 is a cross sectional view taken along line 6—6 of FIG. 5;

FIG. 7 is a perspective view of a right angle embodiment of the present invention;

FIG. 8 is an exploded perspective view of the embodiment shown in FIG. 7;

FIG. 9 is a plan view of an embodiment shown in FIG. 10;

FIG. 10 is a perspective view of a cross-flow embodiment of the present invention;

FIG. 11 is an enlarged fragmentary perspective of the embodiment shown in FIG. 10; and FIG. 12 is an exploded perspective view of the embodiment in FIG. 10.

DETAILED DESCRIPTION OF THE INVENTION

The preferred embodiments of the present invention are directed to a commercially feasible, high density fluid filter which maintains high structural integrity without the need for additional housing elements.

Figure 1:
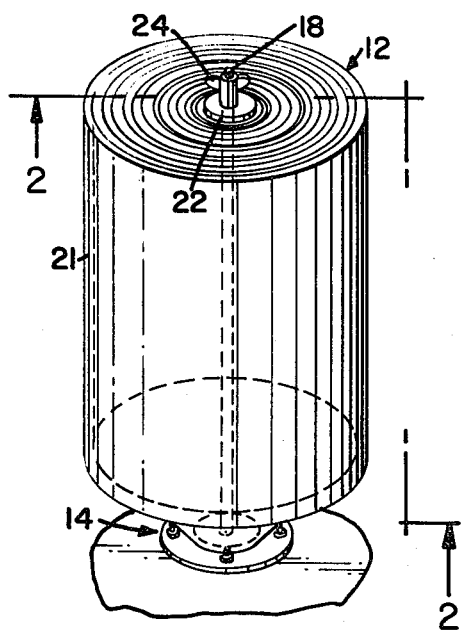
FIG. 1 is a perspective view of a cylindrical filter embodiment of the present invention.
Figure 2:
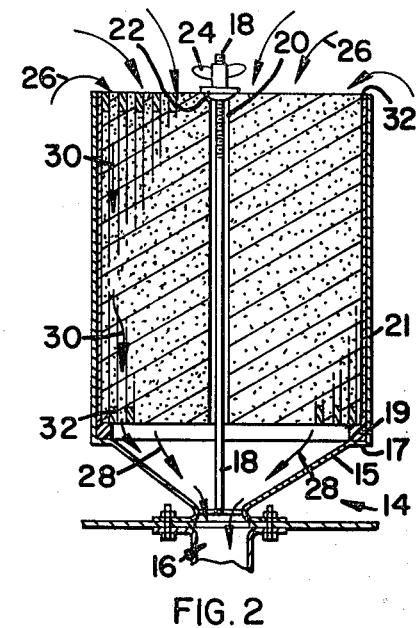
FIG. 2 is a cross sectional view taken along lines 2—2 of FIG. 1.
Figure 4:
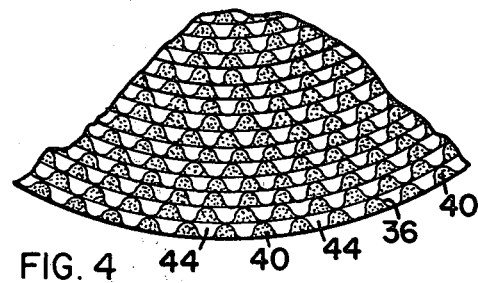
FIG. 4 is an enlarged fragmentary portion of the embodiment in FIG. 1.

Reference should be had to FIGS. 1-4 where there is shown a first embodiment of the present invention. In FIGS. 1 and 2, a cylindrical filtering element 12 is shown in a typical installation wherein the bottom of filter 12 rests upon support 14 which is attached to the fluid intake 16 of the device needing filtered fluid. A bolt 18 runs the length of element 12 through a center hole 20 therein and by means of a washer 22 and a wing nut 24 the filter is affixed to the base 14. Alternatively, center hole 20 may be sealed and the filter may be affixed to the base by clamps.

Washer 22 should be of a sealing type preferably made of a rubber or plastic material in order to prevent any incoming fluid from bypassing filter through hole 20 which runs the length of the filter element. Base 14 includes a cup shaped reduction portion 15 and a flat section 17 to engage to bottom edge of the filter which preferably includes a seal 19 for fluid tight engagement of the filter and base. Extending vertically from flat section 17 is a cylindrical portion 21 which may perferably be used as a guide for proper insertion of the filter and to protect it from rocks and other debris.

It is noted that fluid intake in this device is shown by arrows 26 occurs at the top end thereof and that filter fluids exit by the bottom end as shown by arrows 28. Filtering occurs within the body of filter as shown by arrows 30, details of which will be explained when reference is made to FIG. 6 of a further embodiment.

The filter element 12 preferably includes an impervious barrier element 32 (shown in FIG. 2) which is cylindrical in shape so as to be sized to receive the body of element 12 therewithin. The purpose of barrier 32 is primarily to prevent entry of uncleaned fluid via the sidewalls of the element, thereby directing it in the flow shown by arrows 26. The barrier is not needed for structural integrity and therefore may be made of a coating of sealant material such as urethane or silicon rubber or hot melt caulk rather than a discrete fiber or metal.

Figure 3:
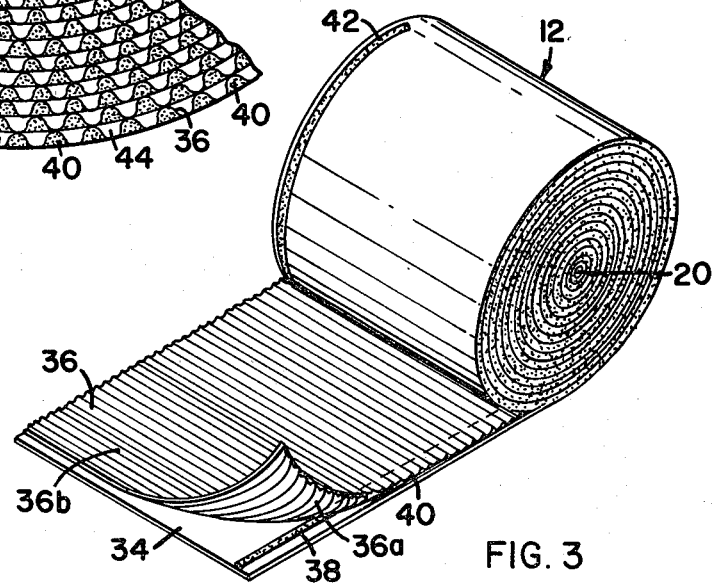
FIG. 3 is a perspective of the embodiment in FIG. 1 partially unassembled.

FIG. 3 shows the construction of the filter in a partially unrolled state. In this embodiment, two layers of filter media are placed one on top of the other and rolled together. The first layer 34 is substantially flat filter media. The second layer 36 is preferably made of a similar filter media; however, it is preferably corrugated such that it has a plurality of side by side peaks and valleys, preferably formed into a sinusoidal configuration. Media layer 36 may also be corrugated to have a different configuration, such as triangular or trapezoidal shape or the like, however, the sinusoidal shape appears to maximize the filtering surface available and thus the loading capacity is thereby increased. The two layers of filter media 34 and 36 are nexted together such that when they are rolled into a cylindrical shape to create a composite roll, it appears that the filter is made up of alternate layers of media which spiral inwardly toward the center. It is preferable to have layer 34 as the outermost layer of the composite roll; however, it is not essential for the operation of the invention.

In the preferred construction, a bead of sealant such as glue 38 is laid between layer 34 and one face 36a of layer 36. When the two layers are brought together, a series of hollow flutes or passages 40 are formed bounded by layer 34 and face 36a. The flutes may be tubular in shape with varied cross sections. The glue 38 acts as a sealant on the peripheral edge where it is preferably placed and causes the passage 40 to be sealed against entry or exit of fluid at this end.

A second bead of glue or sealant material 42 is placed between face 36b of layer 36 and layer 34 toward the peripheral edge of the remaining end of the filter. When the layer 34 and face 36b are brought together, a second set of tubular passage 44 are formed. Their ends are sealed by bed 42 such that fluid may not enter or exit passages 44 at this end.

The filter is completed by rolling the layers together and allowing the sealant bead to solidify. Bead 42 in FIG. 3 is shown as it would appear before the layers are brought together and do not show the spreading and filling which will occur at that time.

In the filtering process, fluid entering the filter at one end may only enter the open passage (either 40 or 44, depending on the end) and must exit flutes which are open on the other end of the filter. During this process, filtering occurs when the fluid must travel in a direction substantially orthogonal to that of its intake direction, pass through a sidewall of either corrugated media 36 or flat media 34 on its way to a passage with an open end. It is noted that all elements of the filter media perform a filtering function, and are not merely used for structural purposes.

If it is desired to insure a solid bond between the peaks and valleys of layer 36 and layer 34, the composite roll may be made under heat and pressure so that the layers will adhere to each other at points of contact or alternatively, adhesive may be added to the peaks to insure a good bond. It is, however, not a problem that there be such a bond for filtering purposes because fluid which might leak through between the layers must still pass through a layer in order to exit the filter, the bond assist only with respect to structural aspects of the filter.

As an alternative to applying beads 38 and 42, it is possible to roll the two sheets of media into the composite roll and inject sealing material, such as hot melt glue by glue gun, into the appropriate passage ends as per above.

An alternative embodiment is shown in FIGS. 5 and 6. This embodiment operates in substantially the same manner as the first embodiment. However, it is formed into a rectangular shape for convenience. In FIG. 5 there is shown a filter element 112 having a top 114, a bottom, (not visible) two sides 116 and 118 and a front 120 and back 122. Sides 116, 118 and the top and bottom are made of a barrier of fluid impervious material which may either be a planar members of a solid structural material such as fiberboard, plastic or metal or may alternatively be a coating of a fluid sealant material which may be applied in a liquid form and let harden. In this embodiment, layers of corrugated filter media 124 are alternated with substantially flat media 126 creating a sandwich-like arrangement. The minimum requirements for such a filter are the fluid impervious walls as shown and at least one layer of corrugated filter media plus the end sealant as explained below. The sandwich of alternate layers creates two series of tubular flutes or passages, 130 and 132, one series on either side of every corrugated filter media 124. Sealant means such as hot melt glue or the like is applied to passages 132 on the front end 120 for every layer of filter media. The sealant means may be applied by injection or as previously in the first embodiment by laying a bead of sealant on the filter media toward front edge 120. Passages 130 which are not blocked at front 120, are sealed in a similar manner on backside 122. FIG. 6 shows in cross section of sealant 133 which is applied to passages 132 and sealant 131 applied to passage 130 opposite faces of the filter.

One possible flow pattern is shown by arrows 136 wherein fluid enters passages 130, crosses through the corrugated media layer 124 and exits by passages 132 on the other end. Alternatively, fluid may pass upwardly or downwardly across the flat media layer 126 and exit via an adjacent passage above or below the passage of entry.

As fluids pass through a media wall, filtering occurs and particulate matter becomes lodged within the media itself. Because this loading will increase the face velocity at that point, particulate matter will tend to be collected at other points along the walls thereby evenly distributing the particulate matter throughout the filter until it is fully loaded.

A further embodiment of the present invention is shown in FIGS. 7 and 8 of the drawings. This embodiment provides for right angle fluid flow as shown in FIG. 7 wherein filter element 212 allows for intake of fluid at face 214 as indicated by arrows 216 and there the outflow occurs at face 218 as indicated by arrows 220. Filter element 212 preferably includes a fluid impervious top and bottom wall 222 and 224, respectively. Two adjacent sidewalls 226 and 228 are also provided.

Disposed between the aforementioned four walls is the sequence of layers of filter media formed at a filter pack 230 which are shown most clearly in an exploded view in FIG. 8. Walls 222–228 are preferably made larger than the filter pack 230 in order to form a partial housing for the filter which helps direct flow. The walls extend beyond the filter pack forming a partial housing around faces 214 and 218. A divider wall 232 is preferably disposed between top and bottom walls 222 and 224 and a corner edge 215 of filter pack 230 at preferably a 135 degree angle relative to a face of the filter pack with one edge of the divider in abutment with edge 215 defined as intersection of adjacent faces of filter pack 230. This divider serves to clearly segregate inlet and outlet flows.

Turning to FIG. 8, the preferred sequence of filter elements can be seen. Filter pack 230 includes at least one corrugated layer of filter media 234, a flat layer of filter media 236 placed atop layer 234 and a third layer of corrugated filter media 238 set atop layer 236 where the corrugations of layer 238 and 234 are substantially orthogonal to each other. The orientation may also be less than 90 degrees and still produce the desired result, however, the fabrication becomes more difficult. The combination of flat and corrugated sheets of media create hollow passages, or flutes. Sealant means is applied to the flutes as shown in FIG. 8 as follows. Opposite edge 240 and 242 along layer 234 are coated with a fluid impervious barrier material which will prevent the entry or exit of fluids therethrough. On edge 244, the sealant material is applied to close passages on both faces of layer 234. Application of sealant may also be made in the same manner as explained for previous embodiments herein.

On layer 238, edges 246 and 248 are sealed in the same manner as edges 240 and 242. Likewise, the passages on both sides of sheet 238 along edge 250 are sealed in the same manner as that of edge 244. This sealing sequence is repeated for however many layers are desired such as that shown in FIG. 8. Flat layer 236 may or may not be sealed when the appropriate edges of the corrugated layers 234 and 238 are sealed. It is likely that layer 236 will be sealed at its peripheral edge along with its adjacent corrugated layers for purely practical reasons of size, however, since fluid will not as a practical matter pass through the filter via this edge, there is no necessity for sealant.

The flow produced is shown by arrows 252 wherein fluid enters passage 254, for example, is blocked by the sealant on end 250 thereof and must exit by passing through a layer 234 which resides between two layers of corrugated filter media. The fluid may then exit by a passage 256 which is oriented orthogonally to that of passage 254. Thus, the intake and outlet flows are at right angles without the need for additional housing apparatus to achieve this flow redirection.

FIGS. 9, 10 and 11 disclose a cross-flow embodiment of this invention. FIG. 9 shows in schematic form by means of arrows 310 the fluid flow within filter element 312. In this embodiment, fluid may enter by two opposing side walls and exits orthogonally in either direction as filter fluid through the remaining sidewalls.

FIG. 10 shows the location of the layers of filter media relative to the top and bottom fluid barriers 314 and 316, respectively. It is preferable to make the top and bottom barriers larger than the filter pack so as to provide means for directing the airflow within the filter. Four divider walls 318 are interposed between top and bottom barriers 314 and 316 at a 135 degree angle and in abutment with each corner of the filter pack in a manner similar to that of wall 232 in FIG. 7, except that here the divider walls are employed on all four edges of the pack as shown in the figure. These walls eliminate the need for a separate housing for separating fluid intake and outlet.

The arrangement of layers of filter media in this embodiment is similar to that as shown in the previous embodiment in FIGS. 7 and 8, except for the points which will be explained below.

FIG. 11 shows an enlarged fragmentary perspective of this filter pack 320 and in exploded perspective in FIG. 12. The filter pack 320 preferably rectangular with four sides 311, 313, 315 and 317, none of which are entirely sealed off from entry or exit of fluids.

As in the previous embodiment, there is a first layer of corrugated filter media 322, a second layer of substantially flat media 324 and a third layer of corrugated media 326 with its corrugations aligned orthogonally to that of layer 322.

Edges and passages of the filter pack are sealed as follows. On sidewall 311, corrugated media layer 322 has its flutes or tubular passages left unsealed. Layer 326 (and optionally 324) are coated or injected with sealant material 340 on edge 311 so as to prevent entry or exit through these exposed sides of the passages. See FIG. 11 for detail. The sequence of sealing on edge 311 is repeated for however many layers there are. On side 315 opposite 311 precisely the same pattern of sealant is applied so that passages formed by the layers 322 and 324 will be open to both sides 311 and 315.

On side 317, layer 322 is sealed along its edge as shown so that fluid may not enter or exit through this portion of the layer and optionally along the adjoining flat layer 324. Corrugated media layer 326 is unsealed on this end with respect to the passages which are formed by layers 326 and 324.

On side 313, precisely the same arrangements for sealing is employed as was used on side 317 so that flutes on either side of layer 326 are open on both ends. This sequence of sealing is repeated for however many layers of filter media are in this pack.

When a filter pack 320 is assembled it will appear as shown in FIG. 11 in the enlarged fragmentary view.

One possible flow pattern for this filter is shown in FIG. 10 wherein arrows 350 indicate the entry of fluids from two sides while arrows 352 illustrate the exit of the fluids from the remaining two sides orthogonal to arrow 350. Although this flow pattern is suggested, it is understood that alternative flow patterns are possible depending on the application of the filter. Numerous characteristics and advantages of the invention have been set forth in the foregoing description together with the details of the structure and function of the invention. Novel features thereof are pointed out in the appended claims. The disclosure, however, is illustrative only, and changes may be made in detail especially in matters of size, shape, arrangement of parts, within the principle of the invention to the full extent intended by the broad general meaning of the terms in which the appended claims are expressed.

I claim:
1. A fluid filter having four sides comprising:
    (a) a pair of fluid impervious members in a spaced relationship forming a top and bottom barier;
    (b) a filter element to be bounded on its upper and lower faces to said barrier elements, said element including a filter pack having:
        a first layer of corrugated filter media having a surface of longitudinal peaks and valleys,
        a second layer atop said first layer, said second layer being of substantially flat filter media,
        a third layer atop said second layer, said third layer being of corrugated filter media having a surface of longitudinal peaks and valleys which are oriented orthogonally to the corrugations in said first layer,
        sealant means for preventing entry or exit or fluid therethrough, applied to said first layer on peripheral edges thereof which are parallel to the axis defined by the longitudinal corrugations of said first layer,
        sealant means for preventing the entry or exit of fluid therethrough applied to said third layer on the peripheral edges thereof which are parallel to the axis defined by the longitudinal corrugations of said third layer.

2. The filter according to claim 1 wherein said filter pack has four sidewalls and including barrier means for blocking passage of fluids applied to two adjacent sidewalls of said fluid pack so that only two remaining sides will allow passage of fluids into and out of said filter.

3. The filter according to claim 2 wherein said barrier means includes a fluid impervious coating.

4. The filter of claim 2 wherein said barrier means includes planar members affixed to said two adjacent sidewalls.

5. The filter of claim 1 or 4 wherein said fluid impervious members extend beyond said filter pack, and including at least one divider member having one edge in abutment with the intersection of adjacent sidewalls, said divider members being between and in contact with said fluid impervious members, thereby dividing inlet and outlet sides of said filter.

6. The filter of claim 5 wherein said divider wall is oriented at about 135 degrees relative to each of said adjacent sides in which it is in abutment.

7. The filter of claim 1 wherein said sealant means includes a fluid impervious coating which is applied to said filter element.

* * * * *